US010847073B2

(12) United States Patent
Huang et al.

(10) Patent No.: US 10,847,073 B2
(45) Date of Patent: Nov. 24, 2020

(54) IMAGE DISPLAY OPTIMIZATION METHOD AND APPARATUS

(71) Applicant: Huawei Technologies Co., Ltd., Shenzhen (CN)

(72) Inventors: Shuai Huang, Shenzhen (CN); Shitong Wang, Shanghai (CN); Jianqiang Ge, Shenzhen (CN); Zhihuang Zou, Shanghai (CN); Miaofeng Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/342,451

(22) PCT Filed: Dec. 6, 2016

(86) PCT No.: PCT/CN2016/108730
§ 371 (c)(1),
(2) Date: Apr. 16, 2019

(87) PCT Pub. No.: WO2018/072271
PCT Pub. Date: Apr. 26, 2018

(65) Prior Publication Data
US 2020/0051477 A1 Feb. 13, 2020

(30) Foreign Application Priority Data

Oct. 17, 2016 (CN) .......................... 2016 1 0905784

(51) Int. Cl.
*G09G 3/20* (2006.01)
*H04N 5/232* (2006.01)
(52) U.S. Cl.
CPC ........... *G09G 3/20* (2013.01); *H04N 5/23293* (2013.01); *G09G 2320/02* (2013.01)

(58) Field of Classification Search
CPC ........ G09G 3/20; G09G 2320/02; G09G 5/00; H04N 5/23293; H04N 5/23222; H04N 5/23216
See application file for complete search history.

(56) References Cited

U.S. PATENT DOCUMENTS 5,270,831 A * 12/1993 Parulski ............. H04N 1/32128
358/403
5,900,909 A * 5/1999 Parulski ............... H04N 1/2112
348/231.6

(Continued)

FOREIGN PATENT DOCUMENTS

CN 1882046 A 12/2006
CN 101640764 A 2/2010

(Continued)

OTHER PUBLICATIONS

Makernote formats and specifications, retrieved from https://web.archive.org/web/20121031143455/https://www.exiv2.org/makernote.html on Apr. 25, 2020 (Year: 2012).*

(Continued)

*Primary Examiner* — Timothy J Henn
(74) *Attorney, Agent, or Firm* — Conley Rose, P.C.

(57) ABSTRACT

An image display optimization method and apparatus, and a terminal are provided to resolve a prior-art problem that it takes a long time to display an image when scenario information analysis is added. The method includes: identifying scenario information included in a to-be-displayed image when receiving a display instruction that is triggered by a user and that is used to display the to-be-displayed image, where the scenario information is written into the to-be-displayed image when the camera shoots the to-be-displayed image; performing display optimization on the to-be-displayed image according to the identified scenario informa- (Continued)

tion; and displaying the display-optimized to-be-displayed image.

20 Claims, 9 Drawing Sheets

(56) References Cited

U.S. PATENT DOCUMENTS

| | | | |
|---|---|---|---|
| 6,195,122 B1 | 2/2001 | Vincent | |
| 2003/0095197 A1* | 5/2003 | Wheeler | H04N 1/624 348/241 |
| 2004/0201726 A1 | 10/2004 | Bloom et al. | |
| 2004/0252200 A1* | 12/2004 | Thomas | H04N 7/142 348/208.4 |
| 2006/0284994 A1 | 12/2006 | Kim | |
| 2011/0032384 A1 | 2/2011 | Ono | |
| 2011/0221924 A1 | 9/2011 | Kuma | |
| 2012/0140092 A1* | 6/2012 | Nourbakhsh | H04N 5/2628 348/231.99 |
| 2012/0170807 A1 | 7/2012 | Paek et al. | |
| 2012/0321273 A1* | 12/2012 | Messmer | H04N 13/128 386/224 |
| 2015/0268846 A1 | 9/2015 | Gao | |
| 2016/0094824 A1 | 3/2016 | Yang et al. | |
| 2016/0254028 A1* | 9/2016 | Atkins | G11B 27/3027 386/241 |
| 2017/0061591 A1* | 3/2017 | Park | G09G 5/06 |
| 2018/0278808 A1* | 9/2018 | Hsu | G06T 5/007 |
| 2019/0370946 A1* | 12/2019 | Samadani | H04N 5/2355 |

FOREIGN PATENT DOCUMENTS

| | | |
|---|---|---|
| CN | 101789233 A | 7/2010 |
| CN | 101996040 A | 3/2011 |
| CN | 102954836 A | 3/2013 |
| CN | 103533244 A | 1/2014 |
| CN | 104159036 A | 11/2014 |
| CN | 104820537 A | 8/2015 |
| CN | 104932849 A | 9/2015 |
| CN | 103391363 B | 10/2015 |
| CN | 105450923 A | 3/2016 |
| EP | 0807352 A1 | 11/1997 |
| JP | 2008271249 A | 11/2008 |
| KR | 20120078980 A | 7/2012 |
| TW | 200304754 A | 10/2003 |

OTHER PUBLICATIONS

Machine Translation and Abstract of Chinese Publication No. CN101789233, Jul. 28, 2010, 12 pages.
Machine Translation and Abstract of Chinese Publication No. CN102954836, Mar. 6, 2013, 13 pages.
Machine Translation and Abstract of Chinese Publication No. CN103391363, Nov. 13, 2013, 10 pages.
Machine Translation and Abstract of Chinese Publication No. CN104820537, Aug. 5, 2015, 18 pages.
Foreign Communication From A Counterpart Application, PCT Application No. PCT/CN2016/108730, English Translation of International Search Report dated Jul. 6, 2017, 2 pages.
Foreign Communication From A Counterpart Application, PCT Application No. PCT/CN2016/108730, English Translation of Written Opinion dated Jul. 6, 2017, 3 pages.
Zhou, L., "Digital camera repair from entry to the master", Retrevied from Internet: https://baike.baidu.com/item/%E6%95%B0%E7%A0%81%E7%9B%B8%E6%9C%BA%E4%BF%AE%E7%90%86%E4%BB%8E%E5%85%A5%E9%97%A8%E5%88%B0%E7%B2%BE%E9%80%9A, May 1, 2011, 5 pages.
Song, Q., "Scene Recognition Technology Research", Electronics and Communication Engineering, 2015, 59 pages. With English Abstract.
Sheldon, "Large caliber small figure Samsung EX1", Retrevied from internet: http://mall.cnki.net/magazine/Article/RXSY201011049.htm,"Portrait Photography" No. 11, 2010, 3 pages.
Machine Translation and Abstract of Chinese Publication No. CN101640764, Feb. 3, 2010, 59 pages.
Machine Translation and Abstract of Chinese Publication No. CN103533244, Jan. 22, 2014, 13 pages.
Machine Translation and Abstract of Japanese Publication No. JP2008271249, Nov. 6, 2008, 66 pages.
Foreign Communication From A Counterpart Application, Chinese Publication No. 201680080589.8, Chinese Office Action dated Oct. 11, 2019, 6 pages.

* cited by examiner

IMAGE DISPLAY OPTIMIZATION METHOD AND APPARATUS

This application is a national stage of International Patent Application No. PCT/CN2016/108730 filed on Dec. 6, 2016, which claims priority to Chinese Patent Application No. 201610905784.1 filed on Oct. 17, 2016. Both of the aforementioned applications are hereby incorporated by reference in their entireties.

TECHNICAL FIELD

This application relates to the field of image processing technologies, and in particular, to an image display optimization method and apparatus.

BACKGROUND

Image display optimization means adjusting a display parameter of a screen of a terminal device according to content of a to-be-displayed image, so as to enable a user to enjoy optimal viewing experience for the to-be-displayed image.

Currently, in a specific process of performing display optimization on an image on the terminal device, after the user taps/clicks an image thumbnail in an image library, the screen of the terminal device loads an image magnification transitional animation until a final image is completely displayed on the screen. When the screen is loading the image magnification transitional animation, a display optimization module of the terminal device analyzes in the background a gray histogram, a color histogram, or a sensitivity (ISO) value of the image to obtain an analysis result, and adjusts the display parameter of the screen of the terminal device according to the analysis result. However, the basic information cannot accurately reflect content of the image; consequently, a related optimization algorithm generates an incorrect screen adjustment parameter, and a final display effect is affected. For example, although both a night image and a backlight image have a large quantity of pixels distributed in a shadow area of a gray histogram, a shadow detail of a photograph subject should be highlighted for the backlight image, but not for the night image.

To improve a display effect, scenario information (such as night or backlight) is analyzed in an image analysis phase. In this way, during display optimization, more accurate and detailed image content information is obtained. However, calculation complexity in the image analysis phase is increased. Generally, it takes 500 ms to 800 ms for the terminal device from receiving a thumbnail tapping/clicking instruction to display a complete image. If a scenario identification algorithm is added in this phase to obtain the scenario information, time consumption for the foregoing image operation is greatly increased, and user experience becomes poor due to image freeze.

SUMMARY

Embodiments of this application provide an image display optimization method and apparatus, and a terminal, to resolve a prior-art problem that it takes a long time to display an image when scenario information analysis is added.

According to a first aspect, this application provides an image display optimization method, where the method may be applied to a terminal device, and the terminal device may include a camera. The method includes:

identifying scenario information included in a to-be-displayed image when receiving a display instruction that is triggered by a user and that is used to display the to-be-displayed image, where the scenario information is written into the to-be-displayed image when the camera shoots the to-be-displayed image; performing display optimization on the to-be-displayed image according to the identified scenario information; and displaying the display-optimized to-be-displayed image.

A scenario in this embodiment of this application may include night, backlight, sky, foliage, food, portrait, overcast, grassland, city, or the like.

Display optimization may include one or a combination of the following operations: color display optimization, contrast display optimization, and definition display optimization.

In this embodiment of this application, to improve a display effect, when the image is shot by using the camera, an image analysis phase is added to analyze the scenario information (such as night or backlight), and the scenario information is written into the image. In this way, during display optimization, display optimization is performed on the image by using the obtained scenario information included in image content information, so that the displayed image is more accurate and detailed, calculation related to scenario identification is avoided when the image is being opened, and image browsing smoothness is improved. In addition, by using an optimization algorithm provided in this embodiment of this application, the scenario information can be transferred between a shooting end and a display end without performing hardware modification on the terminal device.

In a possible design, the scenario information is written into the to-be-displayed image in the following manner:

displaying a preview image on the terminal device when receiving an enabling instruction of the camera, where the preview image is an image collected by using the camera;

determining scenario information of an image in the preview image according to information about the image in the preview image and information obtained by at least one of a light sensor, a GPS sensor, an infrared sensor, a magnetic sensor, a barometric pressure sensor, a laser sensor, or a lens pointing angle sensor; and shooting the to-be-displayed image when receiving an image shooting instruction, and writing the obtained scenario information into the to-be-displayed image.

By using the foregoing design, the scenario information is identified by using a photographing preview phase, so that more sensor information can be obtained to improve accuracy of a determining result.

In a possible design, the determining scenario information of an image in the preview image according to information about the image in the preview image and information obtained by at least one sensor includes:

after receiving the enabling instruction and before receiving the shooting instruction, classifying a scenario of the image in the preview image by using N predefined scenario classifiers according to the information obtained by the at least one sensor and the information about the image in the preview image, to obtain a scenario type output by each scenario classifier, where N is a positive integer not less than 2; and determining scenario information corresponding to a most frequently output scenario type as the scenario information of the to-be-displayed image.

By using the foregoing design, determining results of a plurality of frames of preview images are combined to further improve robustness of a scenario identification algorithm.

In a possible design, the classifying a scenario of the image in the preview image by using N predefined scenario classifiers according to the information obtained by the at least one sensor and the information about the image in the preview image includes:

performing, according to a configuration sequence of the N scenario classifiers, the following operation on images at intervals of a preset quantity of frames in the preview image after receiving the enabling instruction:

when the preset quantity of frames is reached this time, according to the information obtained by the at least one sensor and information about an image, in the preview image, obtained when the preset quantity of frames is reached this time, by using a scenario classifier selected based on the configuration sequence, classifying a scenario of the image, in the preview image, obtained when the preset quantity of frames is reached this time.

In a possible design, the writing the obtained scenario information into the to-be-displayed image includes:

writing the obtained scenario information into a MakerNote MakerNote field of an exchangeable image file EXIF data area of the image.

Without increasing coupling of a shooting end (the camera) and a display end (a display), the scenario information is stored by using the MakerNote field in the EXIF area, a scenario information transfer channel between the shooting end and the display end is connected, and performing display optimization by using the scenario information can be implemented without modifying or adding hardware.

In a possible design, the performing display optimization on the to-be-displayed image based on the scenario information written into the to-be-displayed image includes:

obtaining an optimization parameter corresponding to the scenario information of the to-be-displayed image from a preconfigured lookup table; and adjusting a display parameter of a display screen of the terminal device based on the optimization parameter and displaying the to-be-displayed image.

According to a second aspect, an embodiment of this application further provides an image display optimization apparatus, where the apparatus is applied to a terminal device including a camera, and the apparatus includes:

a receiving module, configured to receive a display instruction that is triggered by a user and that is used to display a to-be-displayed image;

a scenario identification module, configured to identify scenario information included in the to-be-displayed image when the receiving module receives the display instruction, where the scenario information is written into the to-be-displayed image when the camera shoots the to-be-displayed image;

a display optimization module, configured to perform display optimization on the to-be-displayed image according to the scenario information identified by the scenario identification module; and a display module, configured to display the to-be-displayed image display-optimized by the display optimization module.

In a possible design, the display module is further configured to display a preview image after the receiving module receives an enabling instruction of the camera, where the preview image is an image collected by using the camera; and the apparatus further includes:

a scenario information writing module, configured to write the scenario information into the to-be-displayed image in the following manner:

determining scenario information of an image in the preview image according to information about the image in the preview image displayed by the display module and information obtained by at least one of a light sensor, a GPS sensor, an infrared sensor, a magnetic sensor, a barometric pressure sensor, a laser sensor, or a lens pointing angle sensor; and shooting the to-be-displayed image when the receiving module receives an image shooting instruction, and writing the obtained scenario information into the to-be-displayed image.

In a possible design, when determining the scenario information of the image in the preview image according to the information about the image in the preview image and the information obtained by the at least one sensor, the scenario information writing module is specifically configured to:

after the receiving module receives the enabling instruction and before the receiving module receives the shooting instruction, classify a scenario of the image in the preview image by using N predefined scenario classifiers according to the information obtained by the at least one sensor and the information about the image in the preview image, to obtain a scenario type output by each scenario classifier, where N is a positive integer not less than 2; and determine scenario information corresponding to a most frequently output scenario type as the scenario information of the to-be-displayed image.

In a possible design, when classifying the scenario of the image in the preview image by using the N predefined scenario classifiers according to the information obtained by the at least one sensor and the information about the image, in the preview image, obtained when a preset quantity of frames is reached this time, the scenario information writing module is specifically configured to:

perform, according to a configuration sequence of the N scenario classifiers, the following operation on images at intervals of a preset quantity of frames in the preview image after the receiving module receives the enabling instruction:

when the preset quantity of frames is reached this time, according to the information obtained by the at least one sensor and information about an image, in the preview image, obtained when the preset quantity of frames is reached this time, by using a scenario classifier selected based on the configuration sequence, classifying a scenario of the image, in the preview image, obtained when the preset quantity of frames is reached this time.

In a possible design, when writing the obtained scenario information into the to-be-displayed image, the scenario information writing module is specifically configured to write the obtained scenario information into a MakerNote MakerNote field of an exchangeable image file EXIF data area of the image.

In a possible design, the display optimization module is specifically configured to:

obtain an optimization parameter corresponding to the scenario information of the to-be-displayed image from a preconfigured lookup table; and adjust a display parameter of a display screen of the terminal device based on the optimization parameter and display the to-be-displayed image.

According to a third aspect, an embodiment of this application further provides a terminal, including:

a camera, configured to shoot a to-be-displayed image;

a processor, configured to: identify scenario information included in the to-be-displayed image when receiving a display instruction that is triggered by a user and that is used to display the to-be-displayed image, where the scenario information is written into the to-be-displayed image when the camera shoots the to-be-displayed image; and perform display optimization on the to-be-displayed image according to the identified scenario information; and a display, configured to display the display-optimized to-be-displayed image.

The processor may include one or more general processors. The display may use a liquid crystal display (English: Liquid Crystal Display, LCD for short), an OLED (English: Organic Light-Emitting Diode, organic light-emitting diode for short), or the like.

In a possible design, the processor is further configured to instruct the display to display a preview image when receiving an enabling instruction of the camera, where the preview image is an image collected by using the camera;

the display is further configured to display the preview image; and the processor is further configured to: determine scenario information of an image in the preview image according to information about the image in the preview image and information obtained by at least one of a light sensor, a GPS sensor, an infrared sensor, a magnetic sensor, a barometric pressure sensor, a laser sensor, or a lens pointing angle sensor; and shoot the to-be-displayed image when receiving an image shooting instruction, and write the obtained scenario information into the to-be-displayed image.

In a possible design, when determining the scenario information of the image in the preview image according to the information about the image in the preview image and the information obtained by the at least one sensor, the processor is specifically configured to:

after receiving the enabling instruction and before receiving the shooting instruction, classify a scenario of the image in the preview image by using N predefined scenario classifiers according to the information obtained by the at least one sensor and the information about the image in the preview image, to obtain a scenario type output by each scenario classifier, where N is a positive integer not less than 2; and determine scenario information corresponding to a most frequently output scenario type as the scenario information of the to-be-displayed image.

In a possible design, when classifying the scenario of the image in the preview image by using the N predefined scenario classifiers according to the information obtained by the at least one sensor and the information about the image in the preview image, the processor is specifically configured to:

perform, according to a configuration sequence of the N scenario classifiers, the following operation on images at intervals of a preset quantity of frames in the preview image after receiving the enabling instruction:

when the preset quantity of frames is reached this time, according to the information obtained by the at least one sensor and information about an image, in the preview image, obtained when the preset quantity of frames is reached this time, by using a scenario classifier selected based on the configuration sequence, classifying a scenario of the image, in the preview image, obtained when the preset quantity of frames is reached this time.

In a possible design, when writing the obtained scenario information into the to-be-displayed image, the processor is specifically configured to:

write the obtained scenario information into a MakerNote MakerNote field of an exchangeable image file EXIF data area of the image.

In a possible design, when performing display optimization on the to-be-displayed image based on the scenario information written into the to-be-displayed image, the processor is specifically configured to:

obtain an optimization parameter corresponding to the scenario information of the to-be-displayed image from a preconfigured lookup table; and adjust a display parameter of a display screen of the terminal device based on the optimization parameter and display the to-be-displayed image.

DESCRIPTION OF EMBODIMENTS

To make the objectives, technical solutions, and advantages of this application clearer, the following further describes this application in detail with reference to the accompanying drawings. Apparently, the described embodiments are merely a part rather than all of the embodiments of this application. All other embodiments obtained by a person of ordinary skill in the art based on the embodiments of this application without creative efforts shall fall within the protection scope of this application.

The embodiments of this application provide an image display optimization method and apparatus, to resolve a prior-art problem that it takes a long time to display an image when scenario information analysis is added. The method and the apparatus are based on a same inventive concept. Because problem resolving principles of the method and the apparatus are similar, mutual reference may be made to implementations of the apparatus and the method, and details are not described repeatedly.

The image display optimization solution in the embodiments of this application may be implemented by various electronic devices that have a photographing function and that can be used for displaying. The electronic device includes but is not limited to a personal computer, a server computer, a handheld or laptop device, a mobile device (such as a mobile phone, a tablet computer, a personal digital assistant, or a media player), a consumer electronic device, a small computer, a mainframe computer, or the like. However, the electronic device is preferably an intelligent mobile terminal. The intelligent mobile terminal is used as an example below to describe in detail the solutions provided in the embodiments of this application.

Figure 1:
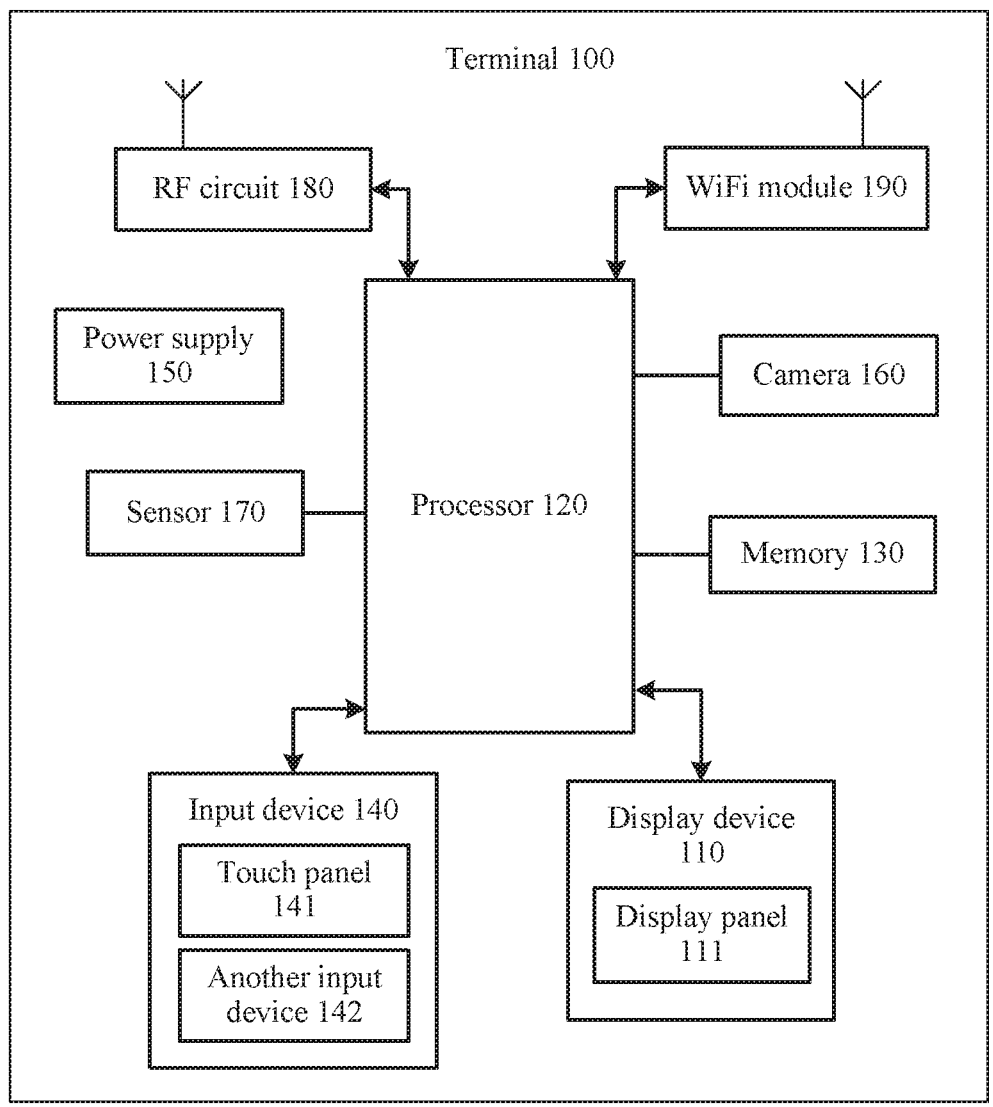
FIG. 1 is a schematic diagram of a terminal device according to an embodiment of this application.

Referring to FIG. 1, FIG. 1 is a schematic diagram of a hardware structure of a terminal applied to an embodiment of this application. As shown in FIG. 1, a terminal 100 includes a display device 110, a processor 120, and a memory 130. The memory 130 may be configured to store a software program and data. The processor 120 runs the software program and the data that are stored in the memory 130, to perform various functional applications of the terminal 100 and process data. The memory 130 may mainly include a program storage area and a data storage area. The program storage area may store an operating system, an application program required by at least one function (such as an image display optimization function or a scenario classifier function), and the like. The data storage area may store data (such as audio data, a phone book, or an exchangeable image file EXIF) created according to use of the terminal 100, and the like. In addition, the memory 130 may include a high-speed random access memory, or may include a nonvolatile memory, such as at least one magnetic disk storage device, a flash storage device, or another volatile solid-state storage device. The processor 120 is a control center of the terminal 100, and connects to various parts of the terminal by using various interfaces and lines. The processor 120 performs various functions of the terminal 100 and processes data by running or executing the software program and/or the data stored in the memory 130, to perform overall monitoring on the terminal. The processor 120 may include one or more general processors, or may include one or more DSPs (Digital Signal Processor, digital signal processor), and is configured to perform a related operation, to implement the technical solutions provided in the embodiments of this application.

The terminal 100 may further include an input device 140, configured to: receive input digital information or character information or a contact touch operation/non-contact gesture, generate signal input that is related to user settings and function control of the terminal 100, and the like. Specifically, in this embodiment of this application, the input device 140 may include a touch panel 141. The touch panel 141, also referred to as a touchscreen, may collect a touch operation of the user on or near the touch panel 141 (such as an operation performed by a user on or near the touch panel 141 by using any appropriate object or accessory such as a finger or a stylus), and drive a corresponding connection apparatus according to a preset program. Optionally, the touch panel 141 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into touch point coordinates, and sends the touch point coordinates to the processor 120, and can receive and execute a command sent by the processor 120. For example, the user taps a picture on the touch panel 141 by using the finger. The touch detection apparatus detects a signal brought by this tap, and transmits the signal to the touch controller. The touch controller converts the signal into coordinates and sends the coordinates to the processor 120. The processor 120 determines, according to the coordinates and a type (tap or double-tap) of the signal, an operation (such as picture magnification or picture full-screen display) performed on the picture, and determines memory space that needs to be occupied for performing the operation. If the memory space that needs to be occupied is less than idle memory, an interface obtained after the application is enabled is displayed in full screen on the display panel 111 included in the display device, so as to enable the application.

The touch panel 141 may be implemented in a plurality of types, such as resistance, capacitance, infrared, and a surface acoustic wave. In addition to the touch panel 141, the input device 140 may further include another input device 142. The another input device 142 may include but is not limited to one or more of a physical keyboard, a function key (such as a volume control key or an on/off key), a trackball, a mouse, a joystick, or the like.

The display panel 111 included in the display device 110 is configured to display information input by the user or information provided for the user, various menu interfaces of the terminal device 100, and the like. In this embodiment of this application, the display panel 111 is mainly configured to display an image in the terminal 100. Optionally, the display panel 111 may be configured in a form of a liquid crystal display (English: Liquid Crystal Display, LCD for short), an OLED (English: Organic Light-Emitting Diode, organic light-emitting diode for short), or the like. In some other embodiments, the touch panel 141 may cover the display panel 111, so as to form a touch display screen.

In addition, the terminal 100 may further include a power supply 150 configured to supply power to other modules and a camera 160 configured to shoot a photo or a video. The terminal 100 may further include one or more sensors 170, such as an acceleration sensor, a light sensor, a GPS sensor, an infrared sensor, a laser sensor, a location sensor, or a lens pointing angle sensor. The terminal 100 may further include a radio frequency (Radio Frequency, RF) circuit 180, configured to communicate with a wireless network device by using a network, or may further include a WiFi module 190, configured to communicate with another device by using WiFi.

Figure 2:
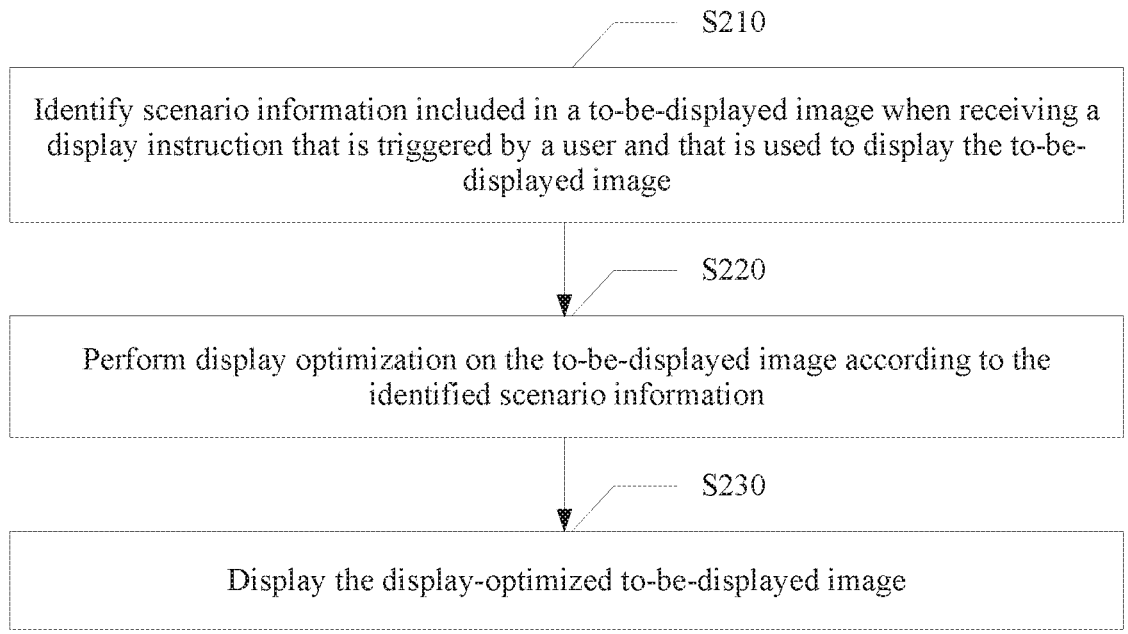
FIG. 2 is a flowchart of an image display optimization method according to an embodiment of this application.

The image display optimization method provided in this embodiment of this application may be implemented in the stored software program shown in FIG. 1, and specifically, may be executed by the processor 120 of the terminal device 100. The terminal device may include a camera. Specifically, as shown in FIG. 2, the image display optimization method provided in this embodiment of this application includes the following steps.

S210. Identify scenario information included in a to-be-displayed image when receiving a display instruction that is triggered by a user and that is used to display the to-be-displayed image. The scenario information is written into the to-be-displayed image when the camera shoots the to-be-displayed image.

A scenario in this embodiment of this application may include night, backlight, sky, foliage, food, portrait, overcast, grassland, city, or the like.

The display instruction in this embodiment of this application may be an instruction triggered when the user taps a thumbnail, or may be an instruction triggered by a leftward or rightward sliding gesture when the user views the image, or may be an instruction triggered by an upward or downward sliding gesture when the user views the image, or may be an instruction triggered when the user taps an image identifier, or may be a print preview instruction when the user triggers printing, or may be an image sharing preview instruction when the user triggers image sharing, or may be a display instruction for a screen saver image, or the like. The image identifier may be an image name, an image ID, or the like.

S220. Perform display optimization on the to-be-displayed image according to the identified scenario information.

Display optimization may include one or a combination of the following operations: color display optimization, contrast display optimization, and definition display optimization.

S230. Display the display-optimized to-be-displayed image.

In this embodiment of this application, to improve a display effect, when the image is shot by using the camera, an image analysis phase is added to analyze the scenario information (such as night or backlight), and the scenario information is written into the image. In this way, during display optimization, display optimization is performed on the image by using the obtained scenario information included in image content information, so that the displayed image is more accurate and detailed, calculation related to scenario identification is avoided when the image is being opened, and image browsing smoothness is improved. In addition, by using an optimization algorithm provided in this embodiment of this application, the scenario information can be transferred between a shooting end and a display end without performing hardware modification on the terminal device.

Figure 3:
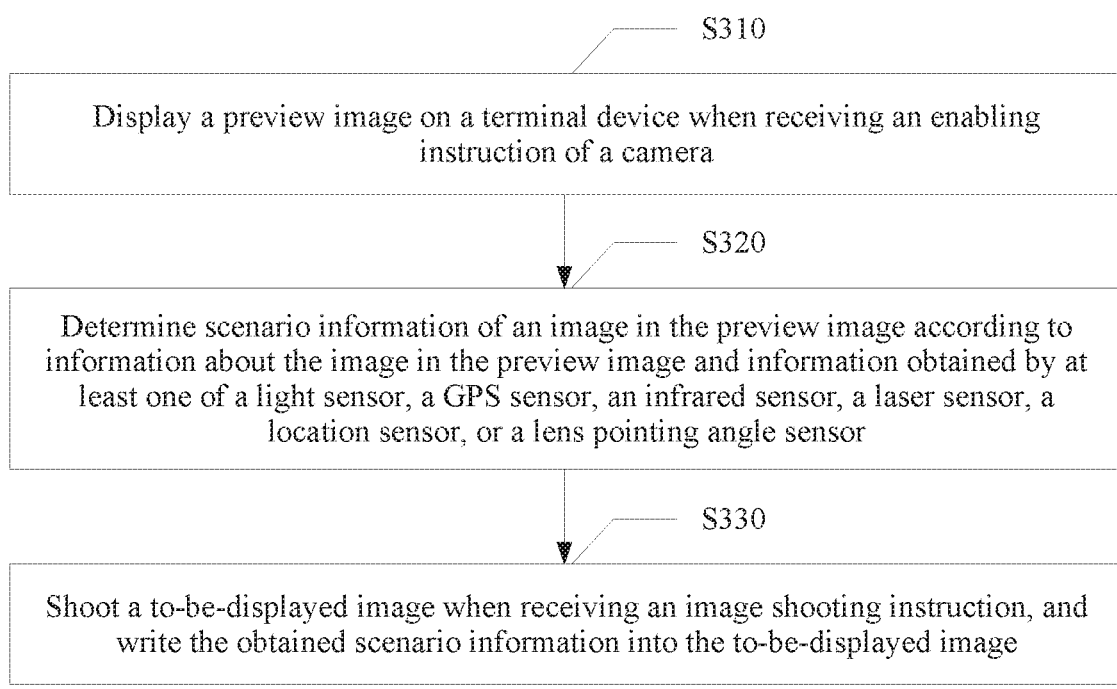
FIG. 3 is a flowchart of a scenario information writing method according to an embodiment of this application.

Optionally, as shown in FIG. 3, the scenario information in this embodiment of this application may be written into the to-be-displayed image in the following manner.

S310. Display a preview image on the terminal device when receiving an enabling instruction of the camera.

The preview image is an image collected by using the camera.

S320. Determine scenario information of an image in the preview image according to information about the image in the preview image and information obtained by at least one of a light sensor, a GPS sensor, an infrared sensor, a magnetic sensor, a barometric pressure sensor, a laser sensor, or a lens pointing angle sensor.

S330. Shoot the to-be-displayed image when receiving an image shooting instruction, and write the obtained scenario information into the to-be-displayed image.

It should be noted that in a period of time after the camera is enabled and before the user triggers the shooting instruction, a plurality of frames of images are displayed in the preview image. Therefore, scenario types of the plurality of frames of images in the preview image may be classified to obtain the scenario information. When the user triggers the shooting instruction, an image with highest shooting definition in last several frames of images in the foregoing period of time is used as a shot image, that is, the to-be-displayed image, and then the scenario information previously identified in the preview image phase is written into the shot image.

Optionally, when the scenario information is written into the to-be-displayed image, the scenario information may be written into a MakerNote (MakerNote) field of an exchangeable image file (English: Exchangeable Image File, EXIF for short) EXIF data area of the image. Certainly, the scenario information may be written into another data area of the image or another field of the EXIF data area. A format of the to-be-displayed image may be a JEPG format, a tagged image file format (English: Tag Image File Format. TIFF for short), or the like.

It should be noted that the exchangeable image file EXIF data area into which the scenario information is written is specifically specified for a digital photographing device, to record attribute information and a shooting data area of a digital photo. The EXIF standard is formulated by the JEIDA organization and is widely used in various digital photographing device scenarios. The EXIF data area stores a large amount of data, the data is stored in the data area in an entry form, and respective functions and IDs are designated. The MakerNote field is designated, in the EXIF standard, to be used to record device-related information of a device manufacturer, and an ID of the MakerNote field is 0x927c. In this embodiment of this application, the scenario information is recorded in the MakerNote field, and a format of the EXIF data area does not need to be modified.

Optionally, determining the scenario information of the image in the preview image according to the information obtained by the at least one sensor and the information about the image in the preview image may be implemented in the following manner:

A1. After receiving the enabling instruction and before receiving the shooting instruction, classify a scenario of the image in the preview image by using N predefined scenario classifiers according to the information obtained by the at least one sensor and the information about the image in the preview image, to obtain a scenario type output by each scenario classifier, where N is a positive integer not less than 2.

Specifically, a plurality of sensors are disposed in the terminal device, such as a light sensor, a GPS sensor, an infrared sensor, a magnetic sensor, a barometric pressure sensor, a laser sensor, and a lens pointing angle sensor. Parameters collected by the plurality of sensors and content of the image in the current preview image are input into the scenario classifiers to output classification results, so as to obtain the scenario types.

The light sensor is configured to measure light in an environment in which the terminal device is located. For example, the light sensor may be used to distinguish between a high-light scenario and a low-light scenario. The GPS sensor is configured to measure a location of the terminal device. The infrared sensor measures a distance according to intensity of received infrared ray. For example, the GPS sensor may be used to distinguish between a scenario including a building and a scenario not including a building. The GPS sensor may be further used to distinguish between a sea scenario and a snow scenario, or the like. The barometric pressure sensor is used to measure atmospheric pressure, and the barometric pressure sensor may be used to distinguish between a plateau scenario and a non-plateau scenario. The barometric pressure sensor, the magnetic sensor, the GPS sensor, the light sensor, or the laser sensor may be further used to distinguish between an indoor scenario and an outdoor scenario. The lens pointing angle sensor is configured to measure an angle between a lens and a horizontal direction. The lens pointing angle sensor may be used to distinguish between a selfie scenario and a non-selfie scenario, and the lens pointing angle sensor may be further used to distinguish between a sky scenario and a foliage scenario, or the like.

A2. Determine scenario information corresponding to a most frequently output scenario type as the scenario information of the to-be-displayed image.

Specifically, classifying the scenario of the image in the preview image by using the N predefined scenario classifiers may be implemented in the following manners:

In a first possible implementation:

according to a configuration sequence of the N scenario classifiers, the following operation is performed on images at intervals of a preset quantity of frames in the preview image after receiving the enabling instruction:

when the preset quantity of frames is reached this time, according to the information obtained by the at least one sensor and information about an image, in the preview image, obtained when the preset quantity of frames is reached this time, by using a scenario classifier selected based on the configuration sequence, classifying a scenario of the image, in the preview image, obtained when the preset quantity of frames is reached this time.

In a second possible implementation:

the following operation is performed on images at intervals of a preset quantity of frames in the preview image after receiving the enabling instruction:

when the preset quantity of frames is reached this time, according to the information obtained by the at least one sensor and information about an image, in the preview image, obtained when the preset quantity of frames is reached this time, by using each of the N scenario classifiers, classifying a scenario of the image, in the preview image, obtained when the preset quantity of frames is reached this time.

If the first possible implementation is compared with the second possible implementation, the first possible implementation is preferred. In the first possible implementation, scenario identification does not need to be performed on each frame of image, and scenario classification identification is performed by sequentially using one scenario classifier and at intervals of a preset quantity of frames, so that time is saved, and fewer resources are used.

In a possible implementation, performing display optimization on the to-be-displayed image based on the scenario information written into the to-be-displayed image may be specifically implemented in the following manner:

B1. Obtain an optimization parameter corresponding to the scenario information of the to-be-displayed image from a preconfigured lookup table (English: Look-Up-Table. LUT for short).

B2. Adjust a display parameter of a display screen of the terminal device based on the optimization parameter and display the to-be-displayed image.

In this embodiment of this application, display optimization may include one or a combination of the following operations: color display optimization, contrast display optimization, and definition display optimization. Therefore, each of the color display optimization, the contrast display optimization, and the definition display optimization is corresponding to an LUT table.

Because the color display optimization, the contrast display optimization, and the definition display optimization have similar working principles, only the contrast display optimization is used as an example for description in this embodiment of this application, and the other two are not described in detail.

A lookup table corresponding to the contrast display optimization is shown in Table 1. In Table 1, $Z_1$ and $Z_2$ represent optimization parameters. $Z_{night,1}$ represents a $Z_1$ value in a night scenario, $Z_{night,2}$ represents a $Z_2$ value in the night scenario, $Z_{backlight,1}$ represents a $Z_1$ value in a backlight scenario, $Z_{backlight,2}$ represents a $Z_2$ value in the backlight scenario, $Z_{sky,1}$ represents a $Z_1$ value in a sky scenario, $Z_{sky,2}$ represents a $Z_2$ value in the sky scenario, $Z_{foliage,1}$ represents a $Z_1$ value in a backlight scenario, and $Z_{backlight,2}$ represents a $Z_{foliage,2}$ value in the backlight scenario.

TABLE 1

|  | $Z_1$ | $Z_2$ |
| --- | --- | --- |
| Night scenario | $Z_{night,1}$ | $Z_{night,2}$ |
| Backlight scenario | $Z_{backlight,1}$ | $Z_{backlight,2}$ |
| Sky scenario | $Z_{sky,1}$ | $Z_{sky,2}$ |
| Foliage scenario | $Z_{foliage,1}$ | $Z_{foliage,2}$ |

A generation principle of the LUT table corresponding to the contrast display optimization is described below.

The contrast display optimization is essentially performing segment gamma (Gamma) correction on a V component of the image in a hue (H) saturation (S) lightness value (V) color space, so as to enhance contrast. A mathematical model may be concluded as:

$$V_{out} = aV_{in}^{\gamma}$$

where $V_{in}$ represents a pixel value of an input image, $V_{out}$ represents a pixel value of an output image, $\gamma$ represents a gamma correction factor, and a represents a constant factor.

Figure 4:
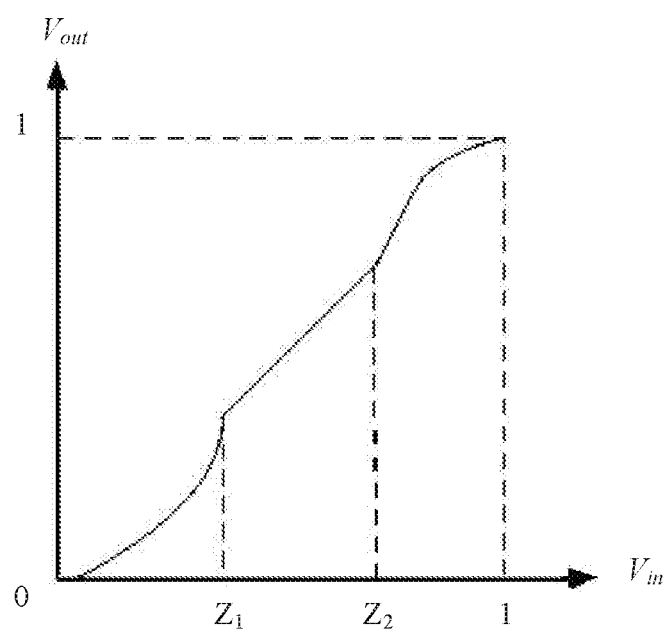
FIG. 4 is a schematic diagram of an adjustment curve for $V_{in}$ and $V_{out}$ according to an embodiment of this application.

An adjustment curve for $V_{in}$ and $V_{out}$ is shown in FIG. 4. In an area with a small lightness value, $V_{in} < Z_1$, $\gamma > 1$, and a pixel value of a shadow area of the image is suppressed. In an area with a relatively large lightness value, $V_{in} > Z_2$, $\gamma < 1$, and a pixel value of a highlight area of the image is increased. An adjusted image has a relatively large dynamic range in both the area with a large lightness value and the area with a small lightness value.

It should be noted that in this embodiment of this application, selection of $Z_1$ and $Z_2$ needs to be adjusted according to the scenario information of the image. Because a night image has a large quantity of shadow pixels, $Z_1$ should take a relatively small value, so as to avoid a shadow detail loss caused because a grayscale value of the shadow pixel is decreased, and a value of $Z_2$ should be slightly smaller but greater than $Z_1$, so as to appropriately increase a highlight dynamic range. A photograph subject area of a backlight image has some shadow pixels, and a background area gathers a large quantity of highlight pixels. Therefore, for the backlight scenario, $Z_1$ should take a relatively large value to improve a detail of the photograph subject part, and $Z_2$ takes a relatively large value to avoid overexposure of the highlight area. Different parameters are adjusted for images corresponding to different types of scenario information, to finally form the LUT table shown in Table 1.

Figure 5A:
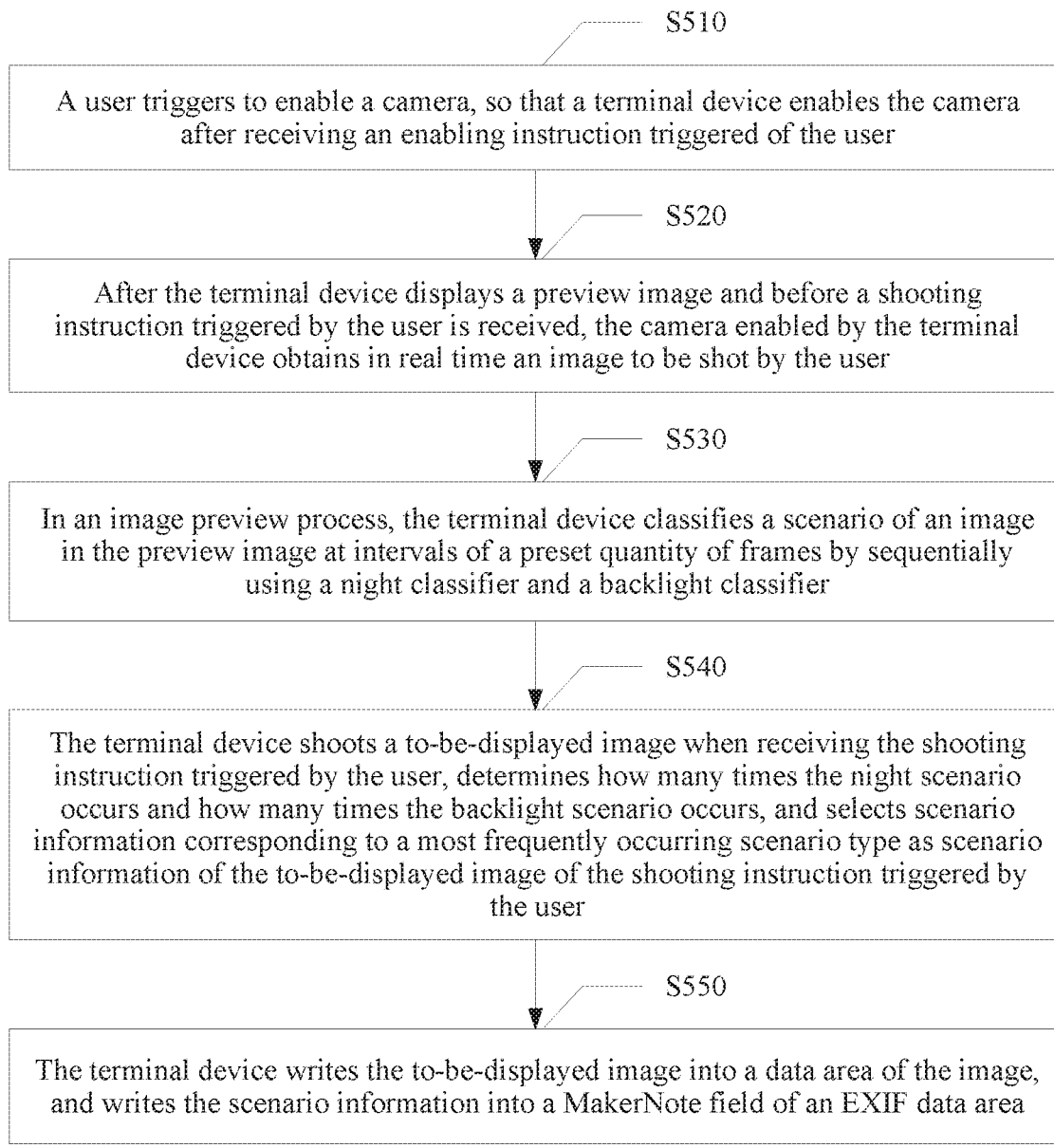
FIG. 5A is a flowchart of a method for writing scenario information into an image according to an embodiment of this application.
Figure 5B:
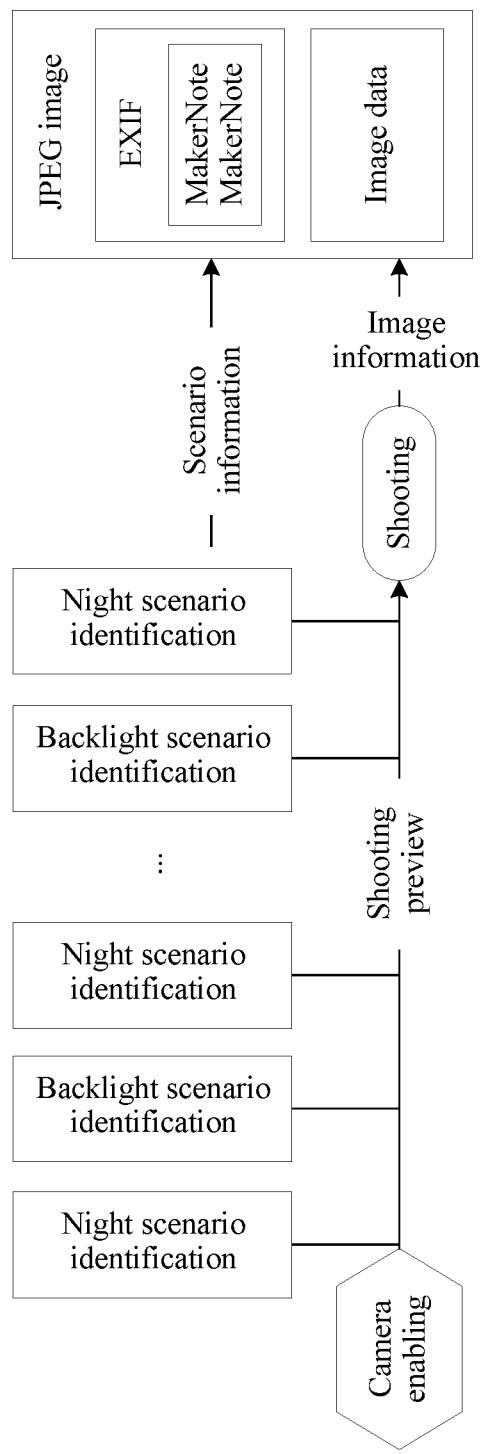
FIG. 5B is a schematic diagram of a method for writing scenario information into an image according to an embodiment of this application.

A scenario type including a night scenario and a backlight scenario is used as an example below. FIG. 5A and FIG. 5B are schematic flowcharts of a method in which a shooting end writes scenario information into an image.

S510. A user triggers to enable a camera, so that a terminal device enables the camera after receiving an enabling instruction triggered of the user.

S520. After the terminal device displays a preview image and before a shooting instruction triggered by the user is received, the camera enabled by the terminal device obtains in real time an image to be shot by the user.

S530. In an image preview process, the terminal device classifies a scenario of an image in the preview image at intervals of a preset quantity of frames by sequentially using a night classifier and a backlight classifier.

Specifically, information about the image in the preview image and information obtained by at least one of a light sensor, a GPS sensor, an infrared sensor, a magnetic sensor, a laser sensor, a barometric pressure sensor, or a lens pointing angle sensor are input into the night classifier or the backlight classifier.

For example, the preset quantity of frames is four frames. In a process in which a display interface presents the preview image, 50 frames of images occur in total. Therefore, in an 8M-7 frame, a scenario of the 8M-7 frame of image is classified by using the night classifier; in an 8M-3 frame, a scenario of the 8M-3 frame of image is classified by using the backlight classifier, where M={1, 2, 3, . . . , 7}, as shown in FIG. 5B.

S540. The terminal device shoots a to-be-displayed image when receiving the shooting instruction triggered by the user, determines how many times the night scenario occurs and how many times the backlight scenario occurs, and selects scenario information corresponding to a most frequently occurring scenario type as scenario information of the to-be-displayed image of the shooting instruction triggered by the user.

S550. The terminal device writes the to-be-displayed image into a data area of the image, and writes the scenario information into a MakerNote field of an EXIF data area.

Figure 6A:
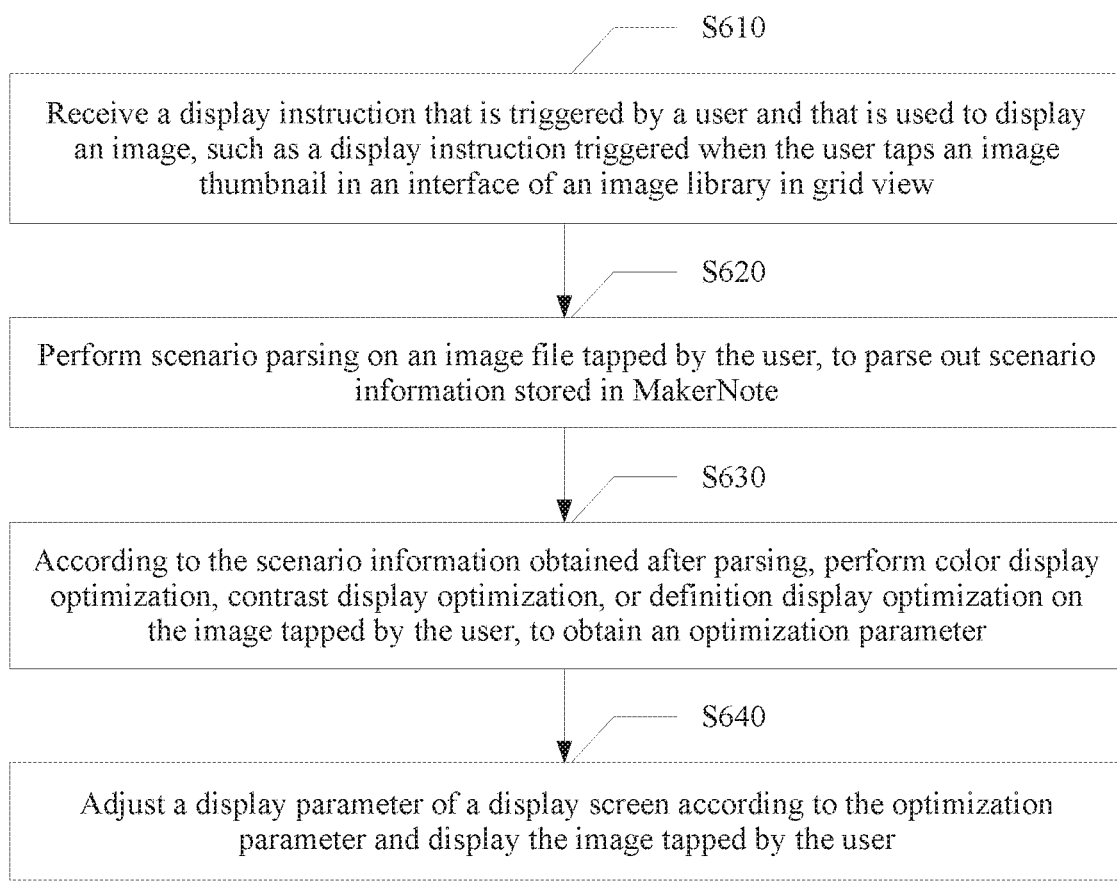
FIG. 6A is a flowchart of a display optimization method according to an embodiment of this application.
Figure 6B:
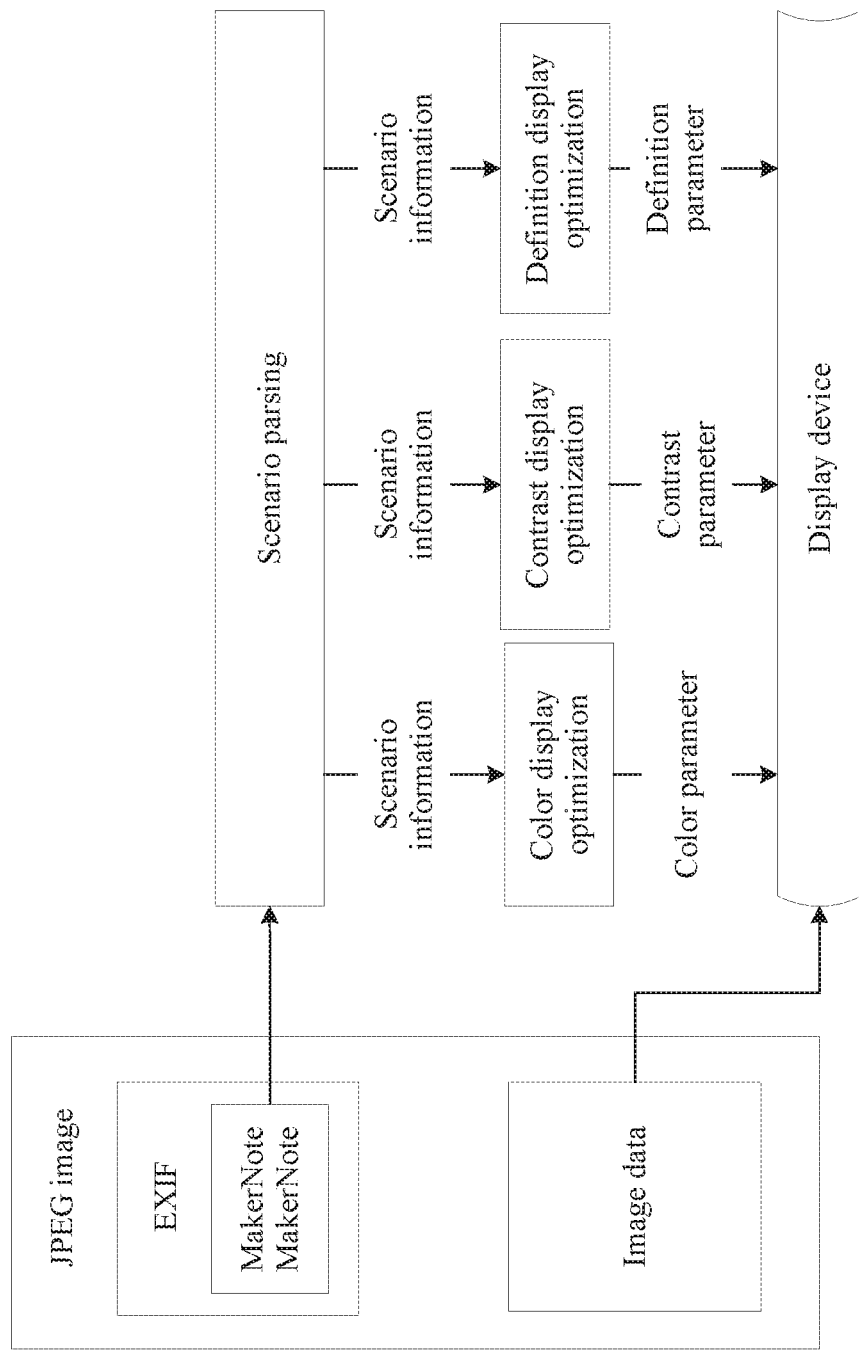
FIG. 6B is a schematic diagram of a display optimization method according to an embodiment of this application.

FIG. 6A and FIG. 6B are schematic flowcharts of a display optimization method.

S610. Receive a display instruction that is triggered by a user and that is used to display an image, such as a display instruction triggered when the user taps an image thumbnail in an interface of an image library in grid view.

S620. Perform scenario parsing on an image file tapped by the user, to parse out scenario information stored in MakerNote.

S630. According to the scenario information obtained after parsing, perform color display optimization, contrast display optimization, or definition display optimization on the image tapped by the user, to obtain an optimization parameter, as shown in FIG. 6B.

S640. Adjust a display parameter of a display screen according to the optimization parameter and display the image tapped by the user.

Figure 7A:
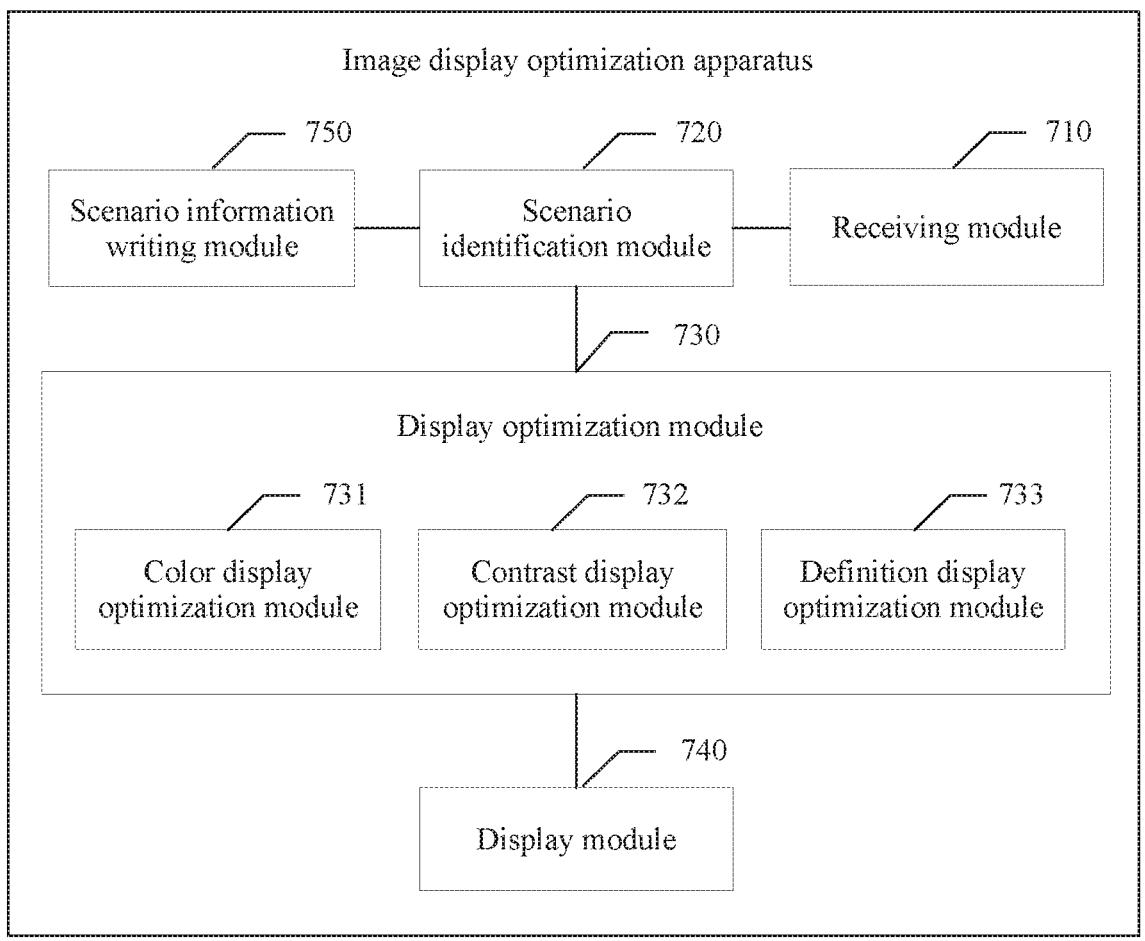
FIG. 7A is a schematic diagram of a display optimization apparatus according to an embodiment of this application.
Figure 7B:
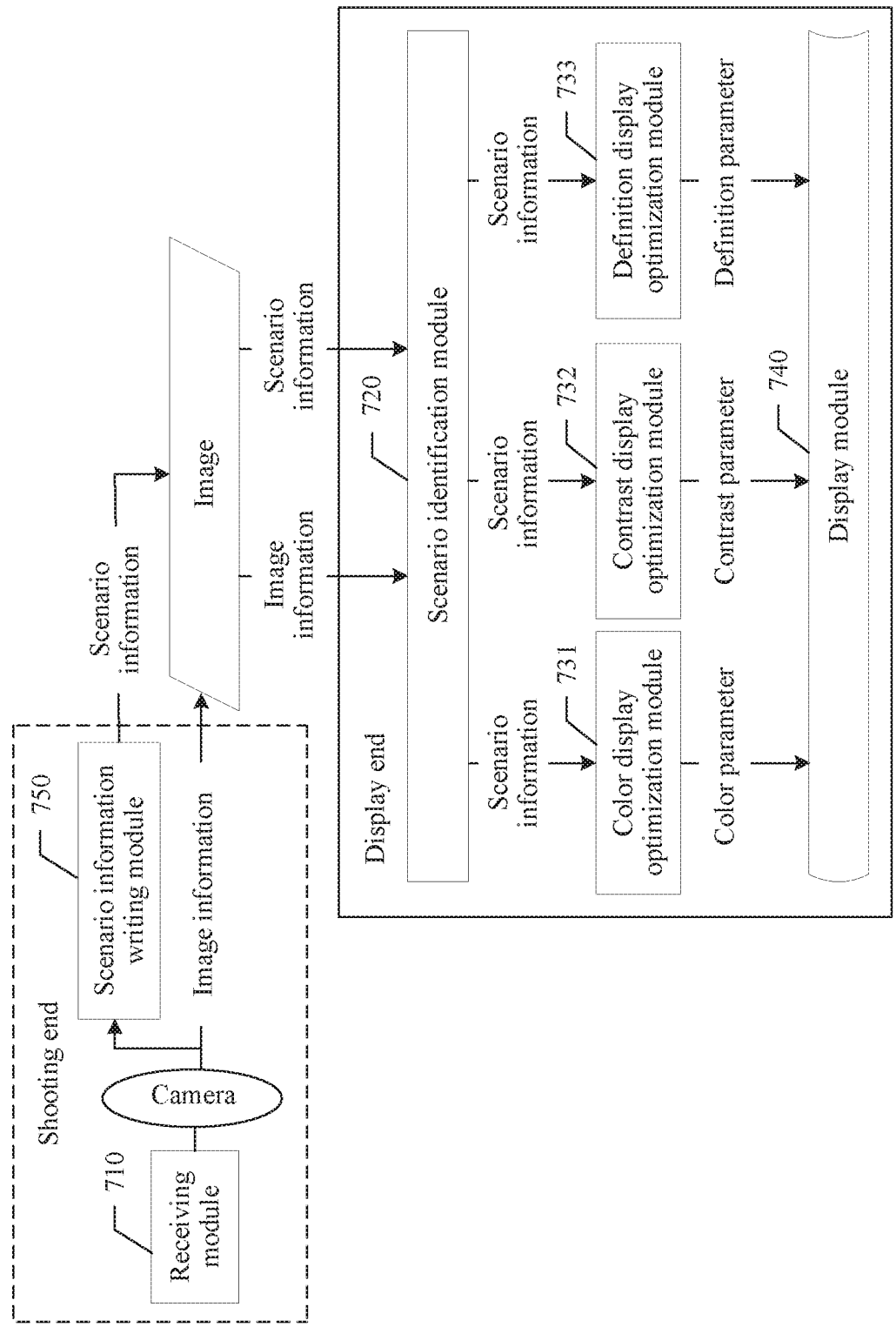
FIG. 7B is a schematic diagram of a principle of implementing display optimization by a display optimization apparatus according to an embodiment of this application.

Based on a same inventive concept as the method embodiments, an embodiment of this application further provides an image display optimization apparatus. The apparatus may be applied to a terminal device. Specifically, the apparatus may be disposed in the terminal device, or may be implemented by using the terminal device. As shown in FIG. 7A and FIG. 7B, the apparatus may include a display end and a shooting end. The display end includes a receiving module 710, a scenario identification module 720, a display optimization module 730, and a display module 740. The shooting end may include a scenario information writing module 750, and may further include a camera. Certainly, the camera may be an external device.

The receiving module 710 is configured to receive a display instruction that is triggered by a user and that is used to display a to-be-displayed image.

The scenario identification module 720 is configured to identify scenario information included in the to-be-displayed image, where the scenario information is written into the to-be-displayed image when the camera shoots the to-be-displayed image.

The display optimization module 730 is configured to perform display optimization on the to-be-displayed image according to the scenario information that is of the to-be-displayed image and that is identified by the scenario identification module 720.

The display module 740 is configured to display the to-be-displayed image display-optimized by the display optimization module 730.

Optionally, the display optimization module 730 may include a color display optimization module 731, a contrast display optimization module 732, and a definition display optimization module 733. The color display optimization module 731 is configured to perform display optimization on a color of the to-be-displayed image, the contrast display optimization module 732 is configured to perform display optimization on contrast of the to-be-displayed image, and the definition display optimization module 733 is configured to perform display optimization on definition of the to-be-displayed image.

Optionally, the display module 740 is further configured to display a preview image after the receiving module 710 receives an enabling instruction of the camera, where the preview image is an image collected by using the camera.

The apparatus may further include a scenario information writing module 750, configured to write the scenario information into the to-be-displayed image in the following manner:

determining scenario information of an image in the preview image according to information about the image in the preview image displayed by the display module and information obtained by at least one of a light sensor, a GPS sensor, an infrared sensor, a magnetic sensor, a barometric pressure sensor, a laser sensor, or a lens pointing angle sensor; and shooting the to-be-displayed image when the receiving module receives an image shooting instruction, and writing the obtained scenario information into the to-be-displayed image.

Optionally, when determining the scenario information of the image in the preview image according to the information about the image in the preview image and the information obtained by the at least one sensor, the scenario information writing module 750 is specifically configured to:

after the receiving module receives the enabling instruction and before the receiving module receives the shooting instruction, classify a scenario of the image in the preview image by using N predefined scenario classifiers according to the information obtained by the at least one sensor and the information about the image in the preview image, to obtain a scenario type output by each scenario classifier, where N is a positive integer not less than 2; and determine scenario information corresponding to a most frequently output scenario type as the scenario information of the to-be-displayed image.

Optionally, when determining the scenario information of the image in the preview image according to the information about the image in the preview image and the information obtained by the at least one sensor, the scenario information writing module 750 is specifically configured to:

perform, according to a configuration sequence of the N scenario classifiers, the following operation on images at intervals of a preset quantity of frames in the preview image after receiving the enabling instruction:

when the preset quantity of frames is reached this time, according to the information obtained by the at least one sensor and information about an image, in the preview image, obtained when the preset quantity of frames is reached this time, by using a scenario classifier selected based on the configuration sequence, classifying a scenario of the image, in the preview image, obtained when the preset quantity of frames is reached this time.

Optionally, when writing the obtained scenario information into the to-be-displayed image, the scenario information writing module 750 is specifically configured to write the obtained scenario information into a MakerNote MakerNote field of an exchangeable image file EXIF data area of the image.

Optionally, the display optimization module 740 is specifically configured to:

obtain an optimization parameter corresponding to the scenario information of the to-be-displayed image from a preconfigured lookup table; and adjust a display parameter of a display screen of the terminal device based on the optimization parameter and display the to-be-displayed image.

Specifically, the scenario information is input into the color display optimization module 731 to obtain a color parameter, the scenario information is input into the contrast display optimization module 732 to obtain a contrast parameter, and the scenario information is input into the definition display optimization module 733 to obtain a definition parameter, as shown in FIG. 7B.

It should be noted that module division in the embodiments of this application is merely an example, and is merely logical function division, and may be other division in actual implementation. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer or a terminal device) or a processor (the processor 120 shown in FIG. 1) to perform all or a part of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, a person skilled in the art can make changes and modifications to these embodiments once they learn the basic inventive concept. Therefore, the following claims are intended to be construed as to cover the preferred embodiments and all changes and modifications falling within the scope of this application.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. An image display optimization method, wherein the image display optimization method is applied to a terminal device comprising a camera, and wherein the image display optimization method comprises:

identifying scenario information comprised in a to-be-displayed image in response to receiving a display instruction that is triggered by a user and that is configured to display the to-be-displayed image, wherein the scenario information is written into the to-be-displayed image in response to shooting the to-be-displayed image by the camera;

performing display optimization on the to-be-displayed image according to the identified scenario information to create an optimized to-be-displayed image, wherein performing the display optimization comprises obtaining an optimization parameter corresponding to the scenario information of the to-be-displayed image from a preconfigured lookup table, and adjusting a display parameter of a display screen of the terminal device based on the optimization parameter; and displaying the optimized to-be-displayed image.

2. The image display optimization method of claim 1, wherein the scenario information is written into the to-be-displayed image by:
- displaying a preview image on the terminal device in response to receiving an enabling instruction of the camera, wherein the preview image comprises one or more image frames collected using the camera;
- determining scenario information of one or more images that correspond to the one or more image frames according to information about the one or more images and information obtained by at least one of a light sensor, a Global Positioning System (GPS) sensor, an infrared sensor, a magnetic sensor, a barometric pressure sensor, a laser sensor, or a lens pointing angle sensor;
- shooting the to-be-displayed image in response to receiving an image shooting instruction, wherein the to-be-displayed image is one of the one or more images; and
- writing the determined scenario information into the to-be-displayed image.

3. The image display optimization method of claim 2, wherein determining the scenario information of the one or more images according to information about the one or more images and information obtained by at least one sensor comprises:
- classifying a scenario of a subset of the one or more images using N predefined scenario classifiers according to the information obtained by the at least one sensor and information about the subset of the one or more images to obtain a scenario type output by each scenario classifier, wherein the classifying is performed after receiving the enabling instruction and before receiving the shooting instruction, and wherein N is a positive integer equal to or greater than two; and
- determining the scenario information of the to-be-displayed image as scenario information corresponding to a most frequently output scenario type.

4. The image display optimization method of claim 3, wherein classifying the scenario of the subset of the one or more images comprises classifying, according to a configuration sequence of the N scenario classifiers after receiving the enabling instruction, a scenario of the subset of the one or more images obtained according to the information obtained by the at least one sensor and the information about the subset of the one or more images that is obtained in response to reaching a preset quantity of frames using a scenario classifier selected based on the configuration sequence, and wherein the subset of the one or images is at intervals of the preset quantity of frames in the preview image.

5. The image display optimization method of claim 2, wherein writing the determined scenario information into the to-be-displayed image comprises writing the determined scenario information into a MakerNote field of an exchangeable image file (EXIF) data area of the image.

6. The method of claim 1, wherein the optimization parameter is associated with at least one of color display optimization, contrast display optimization, or definition display optimization.

7. The method of claim 1, wherein receiving the display instruction comprises receiving a selection of the to-be-displayed image that is represented by an image thumbnail in an interface of an image library.

8. An image display optimization apparatus, wherein the image display optimization apparatus is applied to a terminal device, and wherein the image display optimization apparatus comprises:
- a camera;
- a memory comprising instructions; and
- a processor coupled to the memory and configured to execute the instructions to:
  - receive a display instruction that is triggered by a user and that is configured to display a to-be-displayed image;
  - identify scenario information comprised in the to-be-displayed image in response to receiving the display instruction, wherein the scenario information is written into the to-be-displayed image in response to shooting the to-be-displayed image by the camera;
  - perform display optimization on the to-be-displayed image according to the scenario information, wherein to perform the display optimization, the processor is further configured to execute the instructions to obtain an optimization parameter corresponding to the scenario information of the to-be-displayed image from a preconfigured lookup table, and adjust a display parameter of a display screen of the terminal device based on the optimization parameter; and
  - display the to-be-displayed image.

9. The image display optimization apparatus of claim 8, wherein the processor is further configured to execute the instructions to:
- display a preview image after receiving an enabling instruction of the camera, wherein the preview image comprises one or more image frames collected using the camera; and
- write the scenario information into the to-be-displayed image by:
  - determining scenario information of one or more images that correspond to the one or more image frames according to information about the one or more images and information obtained by at least one of a light sensor, a Global Positioning System (GPS) sensor, an infrared sensor, a magnetic sensor, a barometric pressure sensor, a laser sensor, or a lens pointing angle sensor;
  - shooting the to-be-displayed image in response to receiving an image shooting instruction, wherein the to-be-displayed image is one of the one or more images; and
  - writing the determined scenario information into the to-be-displayed image.

10. The image display optimization apparatus of claim 9, wherein the processor is configured to execute the instructions to determine the scenario information of the one or more images according to the information about the one or more images and the information obtained by the at least one sensor, the processor is configured to:
- classify a scenario of a subset of the one or more images using N predefined scenario classifiers according to the information obtained by the at least one sensor and information about the subset of the one or more images to obtain a scenario type output by each scenario classifier, wherein the scenario of the image is classified after receiving the enabling instruction and before receiving the shooting instruction, and wherein N is a positive integer equal to or greater than two; and
- determine the scenario information of the to-be-displayed image as scenario information corresponding to a most frequently output scenario type.

11. The image display optimization apparatus of claim 10, wherein classifying the scenario of the subset of the one or more images, the processor is configured to execute the instructions to classify, according to a configuration sequence of the N scenario classifiers after receiving the enabling instruction, a scenario of the subset of the one or more images that is obtained according to the information obtained by the at least one sensor and information about the subset of the one or more images in the preview image that is obtained in response to reaching a preset quantity of frames using a scenario classifier selected based on the configuration sequence, and wherein the subset of the one or images is at intervals of the preset quantity of frames in the preview image.

12. The image display optimization apparatus of claim 9, wherein in response to writing the determined scenario information into the to-be-displayed image, the process is configured to write the determined scenario information into a MakerNote field of an exchangeable image file (EXIF) data area of the image.

13. The apparatus of claim 8, wherein the optimization parameter is associated with at least one of color display optimization, contrast display optimization, or definition display optimization.

14. A terminal, comprising:
a camera configured to shoot a to-be-displayed image;
a processor coupled to the camera and configured to:
identify scenario information comprised in the to-be-displayed image in response to receiving a display instruction that is triggered by a user and that is configured to display the to-be-displayed image, wherein the scenario information is written into the to-be-displayed image in response to shooting the to-be-displayed image by the camera; and
perform display optimization on the to-be-displayed image according to the identified scenario information to create an optimized to-be-displayed image, wherein to perform the display optimization, the processor is further configured to obtain an optimization parameter corresponding to the scenario information of the to-be-displayed image from a preconfigured lookup table, and adjust a display parameter of a display screen of the terminal device based on the optimization parameter; and
a display coupled to the processor and configured to display the optimized to-be-displayed image.

15. The terminal of claim 14, wherein the processor is further configured to instruct the display to display a preview image in response to receiving an enabling instruction of the camera, wherein the preview image comprises one or more image frames collected using the camera, wherein the display is further configured to display the preview image, and wherein the processor is further configured to:
determine scenario information of one or more images that correspond to the one or more image frames according to information about the one or more images and information obtained by at least one of a light sensor, a Global Positioning System (GPS) sensor, an infrared sensor, a magnetic sensor, a barometric pressure sensor, a laser sensor, or a lens pointing angle sensor;
shoot the to-be-displayed image in response to receiving an image shooting instruction, wherein the to-be-displayed image is one of the one or more images; and
write the determined scenario information into the to-be-displayed image.

16. The terminal of claim 15, wherein in response to determining the scenario information of the one or more images according to the information about the one or more images and the information obtained by the at least one sensor, the processor is configured to:
classify a scenario of a subset of the one or more images using N predefined scenario classifiers according to the information obtained by the at least one sensor and information about the subset of the one or more images to obtain a scenario type output by each scenario classifier, wherein the classifying is performed after receiving the enabling instruction and before receiving the shooting instruction, and wherein N is a positive integer equal to or greater than two; and
determine the scenario information of the to-be-displayed image as scenario information corresponding to a most frequently output scenario type.

17. The terminal of claim 16, wherein to classify the scenario of the subset of the one or more images, the processor is configured to classify, according to a configuration sequence of the N scenario classifiers after receiving the enabling instruction, a scenario of the subset of the one or more images according to the information obtained by the at least one sensor and information about the subset of the one or more images that is obtained in response to reaching a preset quantity of frames using a scenario classifier selected based on the configuration sequence, and wherein the subset of the one or images is at intervals of the preset quantity of frames in the preview image.

18. The terminal of claim 15, wherein in response to writing the determined scenario information into the to-be-displayed image, the processor is configured to write the determined scenario information into a MakerNote field of an exchangeable image file (EXIF) data area of the image.

19. The terminal of claim 14, wherein the optimization parameter is associated with at least one of color display optimization, contrast display optimization, or definition display optimization.

20. The terminal of claim 14, wherein to receive the display instruction, the processor is further configured to receive a selection of the to-be-displayed image that is represented by an image thumbnail in an interface of an image library.

* * * * *